J. E. DANIELS.
SEAM RIPPER.
APPLICATION FILED JULY 27, 1911.
1,021,863.
Patented Apr. 2, 1912.
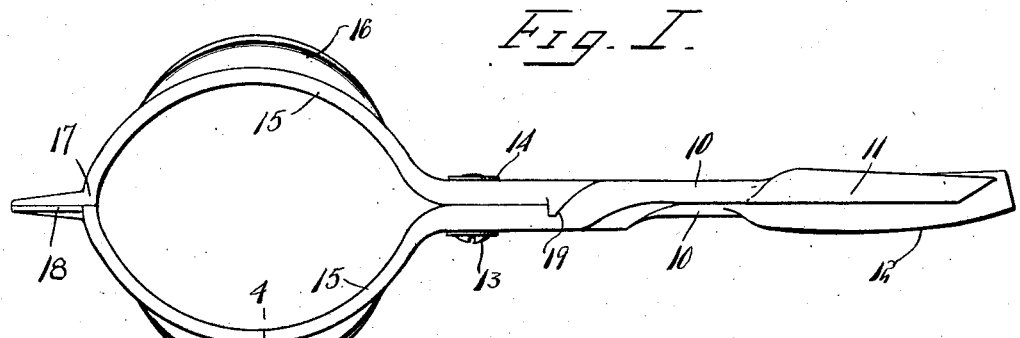
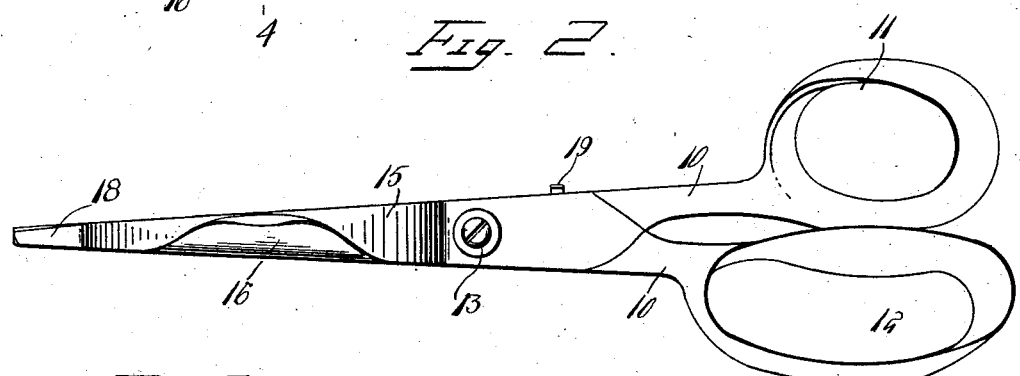
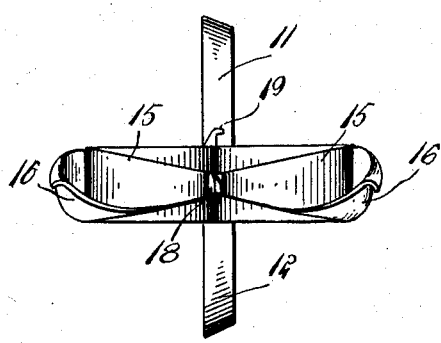
Inventor
J. E. Daniels.
Witnesses
J. C. Simpson
John L. Burch
By 
Attorneys

UNITED STATES PATENT OFFICE.

JAMES E. DANIELS, OF MONROE, CALIFORNIA.

SEAM-RIPPER.

1,021,863. Specification of Letters Patent. Patented Apr. 2, 1912.

Application filed July 27, 1911. Serial No. 640,849.

*To all whom it may concern:*

Be it known that I, JAMES E. DANIELS, a citizen of the United States, residing at Monroe, in the county of Mendocino, State of California, have invented certain new and useful Improvements in Seam-Rippers; and I do hereby declare the following to be a full, clear, and exact description of the invention, such as will enable others skilled in the art to which it appertains to make and use the same.

This invention relates to an improved form of scissors and more especially to a seam ripper.

An object of the invention is to provide an improved form of blade structure for the scissors whereby the seam in cloth may be ripped much faster, easier and with better results than now accomplished without injuring the fabric or cloth.

Another object of the invention is to provide the blades with cutting ends and with flanged portions adapted to hold the separated edges of the cloth in spaced relation during the ripping operation so as to properly guide the cloth to partly free and separate the sewed edges and to permit the ripping to be more efficiently and more quickly carried out.

With the above and other objects in view the invention consists of certain other combinations and arrangements of parts as will be hereinafter more fully described and claimed, it being a still further object to provide a device which will not be likely to get out of working order.

In the drawings: Figure 1 is a top plan view of my improved scissors. Fig. 2 is a side elevation thereof. Fig. 3 is a front elevation of the device. Fig. 4 is a sectional view taken on the line 4—4 of Fig. 1.

Referring to the drawings in detail, there is shown my improved form of scissors or seam ripper having the shank portions 10 provided with the usual gripping eyes 11 and 12 respectively, the latter of which is larger than the former for the entrance of the four fingers of the hand while the former is adapted for the entrance of the thumb. These shank portions 10 are pivotally connected by a screw bolt 13 and secured by a nut 14 so as to adjust the parts relative to each other and attain the proper tension. The shank portions 10 are formed with a spreader member outwardly of its pivotal connection the same being formed by extending or curving the same outwardly as shown at 15 in opposite directions and formed with upturned side flanges 16 extending to the top edges of the said portions 15 and gradually tapering toward the bottom edges thereof as shown. The extremities of the portions 15 are bent at right angles as shown at 17 and extended forwardly to form sharpened blades or points 18 adapted for cutting the threads of the seam when the device is in use. One of said shank portions 10 is further provided with an extension or shoulder 19 which extends upwardly and is offset at right angles toward the opposite shank portion to limit the spreading of the blades 18 and thus assist in the cutting operation.

When the device is in use, the seam is sufficiently ripped to insert each side of the cloth in the flanged portions 16 of the spreader or curved portions 15 and the separated portions of the cloth are gripped or grasped in one hand beneath the handles of the ripper to hold the cloth taut and with the comparatively short blade portions 18 in an open position limited by the movement of the shoulder 19, the scissors are operated in the usual manner and owing to the fact that the cloth when engaged around the flanged portions 16 will partly separate the seam to expose the stitches, the ripping operation can be more quickly accomplished.

The device may be constructed of any suitable material and adjusted to suit the user. The ripper may also be formed or manufactured in different sizes and it will be obvious that the construction is such that they may be manufactured at but slight increase over the cost of ordinary scissors.

I claim:—

In a seam ripper, pivotally connected shanks having handle portions formed at their rear ends, a shoulder arranged on one shank portion and limiting the spreading thereof, the portions of the shanks beyond the pivot being bowed laterally in opposite directions with bottom flanges turned upwardly and outwardly and tapering toward the central portion of their free edges, the extremities of the bowed portions being brought in contact and extended forwardly at right angles to provide cutting points, said flange portions being adapted to receive the severed edges of the cloth for holding the same separated.

In testimony whereof, I affix my signature, in presence of two witnesses.

JAMES E. DANIELS.

Witnesses:
WM. A. HAAS,
L. B. CHARLES.

Copies of this patent may be obtained for five cents each, by addressing the "Commissioner of Patents, Washington, D. C."